United States Patent [19]

Lauber

[11] Patent Number: 4,634,101

[45] Date of Patent: Jan. 6, 1987

[54] CONVERTIBLE ROPE PULLING AND WALKING MACHINE

[75] Inventor: Ernst Lauber, Thun, Switzerland

[73] Assignee: Willy Habegger AG, Switzerland

[21] Appl. No.: 701,108

[22] Filed: Feb. 13, 1985

[30] Foreign Application Priority Data

Feb. 17, 1984 [DE] Fed. Rep. of Germany ....... 3404758

[51] Int. Cl.⁴ .............................................. B62D 57/02

[52] U.S. Cl. ..................................... 254/228; 254/264

[58] Field of Search ............... 254/228, 247, 254, 264, 254/238, 207, 384; 182/133, 136

[56] References Cited

U.S. PATENT DOCUMENTS

| | | | |
|---|---|---|---|
| 1,366,487 | 1/1921 | Pitou | 182/136 |
| 3,028,143 | 4/1962 | Cheskin | 182/133 X |
| 3,126,071 | 3/1964 | Basset | 182/133 X |
| 3,266,776 | 8/1966 | Catu | 254/228 X |
| 3,474,946 | 10/1969 | Desplats | 226/112 |
| 3,927,862 | 12/1975 | Cavalieri | 254/264 |
| 4,448,393 | 5/1984 | Habegger | 254/264 |
| 4,456,226 | 6/1984 | Stumpmeier | 254/264 |

FOREIGN PATENT DOCUMENTS

| | | | |
|---|---|---|---|
| 197375 | 2/1920 | Canada | 182/136 |
| 1255269 | 11/1967 | Fed. Rep. of Germany | 254/264 |
| 615887 | 2/1980 | Switzerland | 254/254 |
| 156555 | 7/1921 | United Kingdom . | |

*Primary Examiner*—Stuart S. Levy
*Assistant Examiner*—Katherine Matecki
*Attorney, Agent, or Firm*—McGlew & Tuttle

[57] ABSTRACT

A rope pulling machine is convertible into a walking machine, and has a machine frame composed of a pulling station movable back and forth and a gripping station connected to the pulling station via a main cylinder/piston arrangement, the pulling and gripping stations each having an auxiliary cylinder/piston arrangement for a gripper, and the two grippers are linked via bearing shafts to the auxiliary cylinder/piston arrangement. The grippers have clamping jaws aligned in a rope direction and linked via bearing shafts to the pulling and gripping stations, respectively. The bearing shafts are designed as detachable shafts, making the grippers exchangeable with walkers having the same bearing points and bearing shafts and which form a walk station and a slave station. The walkers have pawls engaging a rack alternately, and running gears guided on the rack. In the course of converting a rope pulling machine into a walking machine and vice versa, the machine frame, the cylinder/piston arrangements, and control device provided therefor remain intact and unchanged.

8 Claims, 3 Drawing Figures

CONVERTIBLE ROPE PULLING AND WALKING MACHINE

FIELD AND BACKGROUND OF THE INVENTION

This invention relates in general to mining devices and in particular to a new and useful convertible rope pulling-walking machine.

The invention relates particularly to a rope pulling machine with a divided machine frame composed of a pulling station movable back and forth in the longitudinal direction of the rope and a gripping station connected to the pulling station via a main cylinder/piston arrangement. Both the pulling station and the gripping station have an auxiliary cylinder/piston arrangement for each of two grippers, and the two grippers are linked via bearing shafts to the auxiliary cylinder/piston arrangement and they also have clamped jaws aligned in a rope direction. The clamping jaws are linked via bearing shafts to the pulling and gripping stations, respectively, and have a control device for the main cylinder/piston and auxiliary cylinder/piston arrangements for their respective motion cycles.

In such a rope pulling machine, the two grippers operate intermittently, the one gripper keeping the load attacking the rope in a position at rest while the other gripper performs the return travel to regrip the rope. Basically, when two grippers each are used, the operation can also be performed so that the load can be raised or lowered continuously without interrupting its motion. In both cases, an unlimited stroke is achieved due to the alternately working grippers, considering that the pulling station is movable back and forth.

SUMMARY OF THE INVENTION

The invention provides a rope pulling machine which is easy to convert into a walking machine, leaving the machine frame, the cylinder/piston arrangements, and their control device untouched.

The inventive rope pulling machine includes bearing shafts designed as detachable shafts, making the grippers exchangeable against walkers with the same bearing points and bearing shafts, forming a walking station and a slave station, the walkers having pawls alternately engaging a rack and guides guided on the rack. The consequence of these inventive measures is that, after the grippers have been exchanged for walkers, the machine according to the invention can be placed on a rack, operating as a walking machine due to the walking station being movable back and forth if the rack is installed horizontally, for instance, and as climbing machine if the rack is installed vertically, for instance. In contrast to the embodiment as a rope pulling machine in which the rope travels through the machine, as it were, the machine with a stationary rack performs a reverse relative motion and travels as a walking machine on the rack. To convert the rope pulling machine into the walking machine, the machine frame, the cylinder/piston arrangements, and the control device therefore remain unchanged. The originating walking machine can be employed e.g. to raise and lower heavy loads. For example, when erecting skeletons, dams, or assembling rockets or the like, work platforms of great height or depth are worked with which must be reliably supported, for safety reasons, at any level on support or guide columns or through the use of auxiliary structures. This succeeds through the use of one or more walking machines according to the invention which are particularly well suited to secure heavy loads and expensive equipment which must often be available on a work platform because they realize a walk system with rack support at the respective guiding structure. It is therein that the essential advantages achieved by the invention are to be seen.

Other embodiments of the invention are enumerated in the following. For example, the invention provides for the pulling and gripping stations, respectively the walking and slave stations, to be designed as L-shaped stations aligned in a rope or rack direction whose mutually facing, upright, shorter L-legs contain the cylinder/piston arrangements aligned parallel to the longer L-legs facing away from each other. The stations also contain the control device therefor, the clamping jaws of the grippers being linked or the walkers being attacheable to the longer L-legs. This makes for a particularly slim design. In this connection, the main cylinder/-piston arrangement may have a piston rod with a longitudinal center bore for the rope or also a rod to go through. But the possibility also exists to provide parallel main cylinder/piston arrangements between which the rope or rack runs centrally. A simple and functional walking machine design is obtained in that the walkers have base parts attachable to the longer L-legs of the walk and slave stations, there being linked to the base parts the guides on the one hand and lever mechanisms for the pawls on the other, the lever mechanisms being linked additionally to the auxiliary cylinder/piston arrangements and to the guides. It is thus through the interposition of the lever mechanisms that the pawls are actuated by means of the unchanged auxiliary cylinder/piston arrangements. The base parts, at least the pawls and the guides, encompass the longer L-legs of the walk and slave stations by means of U-shaped bearing cheeks in order to achieve a symmetrical arrangement of of the walking machine on the rack. According to the invention, the guides are designed as running gears or carriages accommodating the rack between them. For this purpose, the rack has treads or guide flanges on both sides.

According to a preferred embodiment of the invention, which merits independent importance, it is provided for the auxiliary cylinder/piston arrangements to open and close the clamping jaws to be adjusted to or designed for such a weak opening force that the engaged clamping jaws are opened only after they are almost completely relieved of the load. For example, the opening force is only 2 to 5% of the rated load, i.e. the maximum pulling force attaching the rope. In this manner, a delayed opening of the clamping jaws is achieved, as it were, and it is made certain that the clamping jaws of the other gripper are already closed and have almost completely taken on the rated load. Analogously, the invention teaches for the walking machine that the auxiliary cylinder/piston arrangements to pivot the pawls in and out are adjusted to or designed for such a weak pivoting out force that the engaged pawls are pivoted out only after they are almost completely relieved of the load. Finally, to close the clamping jaws or pivot in the pawls, the clamping jaws or pawls may be acted upon by preloaded springs.

Accordingly, it is an object of the invention to provide a convertible rope pulling and walking machine which includes a first machine frame part which has a main cylinder, a second maching frame part which follows the first machine frame part and has a forwardly projecting piston slidable in the cylinder, and each frame part including an auxiliary drive piston and cylinder combination in exchangeable rope gripping mechanism and a machine walker mechanism which may be driven by the auxiliary piston and cylinder combinations.

A further object of the invention is to provide a machine which may be converted between a rope pulling machine and a walking machine and which includes a machine frame having actuating means in the form of cylinder and piston arrangements and a control device therefor with exchangeable means for effecting rope pulling or walking.

A further object of the invention is to provide a mining machine device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1, 2:
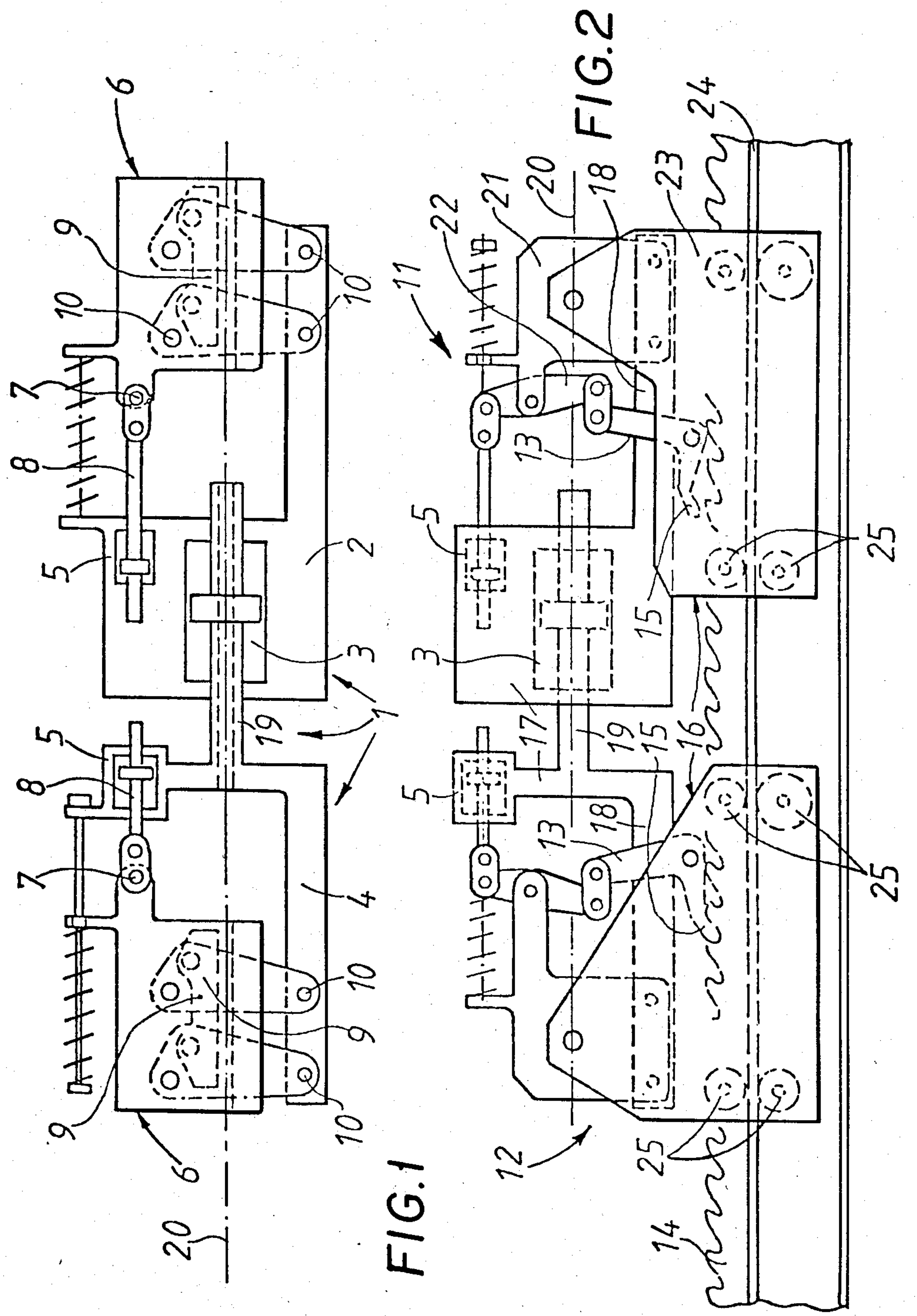
FIG. 1 depicts a schematic side elevational view of a rope pulling machine constructed in accordance with the invention.
FIG. 2 is a view similar to FIG. 1 after conversion of the machine into a walking machine.
Figure 3:
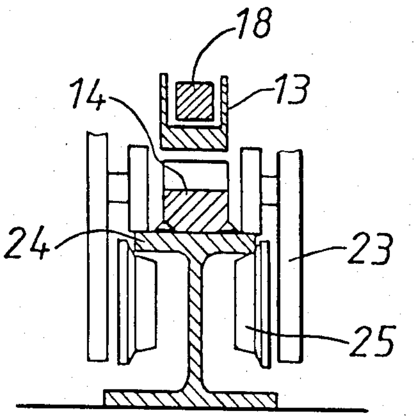
FIG. 3 is a partial vertical section of the machine of FIG. 2.

Referring to the drawings in particular the invention embodied therein comprises a convertible pulling and walking machine generally designated 1 which includes two main frame portions 2 and 4 having articulation means in the form of a main cylinder 3 on the frame portion 2 which is engaged by a piston portion 19 carried by the frame portion 4. The articulation or main piston/cylinder means is effected to permit advancing of the main frame 2 and then the pulling up of the other frame 4 in an advancing operation.

In accordance with the invention the frames 2 and 4 carry auxiliary articulating means in the form of a piston and cylinder combination including an auxiliary piston/cylinder means 5 on each frame and a piston having rod portions 8 which is movable in the cylinder for the purpose of effecting either the gripping and or releasing of a rope by clamping means 9 for rope pulling of a rope 20 which is guided within each of the frames 2 and 4 or for effecting the walking of the device through an operating lever mechanism 22 which is actuated by the piston rod 8 through a lever mechanism or linkage 22 to pivot a walker 13 which is guided in a rack 14.

In the figures a convertible rope pulling machine is depicted with a divided machine frame 1 composed of a pulling station 2 movable back and forth in the longitudinal direction of the rope and a gripping station 4 connected to the pulling station 2 via a main cylinder/piston arrangement 3. The pulling station 2 and the gripping station 4 each have an auxiliary cylinder/piston arrangement 5 for a gripper 6. The two grippers 6 are linked via driving bearing shafts 7 to the piston rods 8 of the auxiliary cylinder/piston arrangements 5 and have clamping jaws 9 aligned in a rope or longitudinal direction. Mounting bearing shafts 10 also link the pulling station 2 and gripping station 4. In addition, a control device, not shown, for the motion cycles of the cylinder/piston arrangements 3,5 is provided.

The bearing shafts 7 and 10 are designed as detachable shafts, making the grippers 6 exchangeable against walkers 13 with the same bearing points and bearing shafts 7 and 10, forming a walking station 11 and a slave station 12. The walkers 13 have pawls 15 alternately engaging a rack 14 and guides 16 guided on the rack 14. The pulling and gripping stations 2, 4, respectively the walking and slave stations 11,12 are designed as L-shaped stations aligned in a rope or a rack direction whose mutually facing, upright, shorter L-legs 17 contain the cylinder/piston arrangements 3, 5 aligned parallel to the longer L-legs 18 facing away from each other, and the control device therefor, the clamping jaws 9 of the grippers 6 being linked and the walkers 13 being attachable to the longer L-legs 18. The main cylinder/piston arrangement 3 has a piston rod 19 with a longitudinal center bore for the rope 20 to go through.

The walkers 13 required for the walking machine have base parts 21 which can be attached to the longer L-legs 18 of the walking and slave stations 11, 12. Linked to the base parts 21 are running gears or guides 16, and also lever mechanisms 22 for the pawls 15, the lever mechanisms 22 being additionally linked to the auxiliary cylinder/piston arrangements 5 and to the guides 16. The base parts 21, at least the pawls 15 and the guides 16, encompass the longer L-legs 18 of the walk and slave stations 11, 12 by means of U-shaped bearing cheeks 23. The longer L-legs 18 run parallel to the rack 14. The guides 16 are designed as running gears accommodating the rack 14 between them. For this purpose, the rack 14 has, on both sides, treads 24 which interact on their top and bottom sides with rollers 25 on the bearing cheeks 23 of the running gears or guides 16. This arrangement of the treads 24 between the rollers 25 also prevents the walking machine from lifting off the rack 14.

In the rope pulling machine, the auxiliary cylinder/piston arrangements 5 to open and close the clamping jaws 9 are adjusted to or designed for such a weak opening force that the engaged clamping jaws open only after they are almost completely relieved of the load and the clamping jaws of the other gripper 6 have consequently taken on the load. The situation is similar in the walking machine. In that case, the cylinder/piston arrangements 5 to pivot the pawls 15 in and out are adjusted to or designed for such a weak pivoting out force that the engaged pawls pivot out only after they are almost completely relieved of the load or the pawls in the other walker 13 have taken on the load. To close the clamping jaws 9 or pivot in the pawls 15, the clamping jaws or pawls are acted upon by preloaded springs.

While specific embodiments of the invention have been shown and described in detail to illustrate the application of the principles of the invention, it will be understood that the invention may be embodied otherwise without departing from such principles.

What is claimed is:

1. A convertible rope pulling and walking machine comprising:

a machine frame having a pulling frame portion defining a pulling station and a gripping frame portion defining a gripping station, said pulling and gripping frame portions being movable in a longitudinal direction back and forth along a rope, said machine frame having guide means for guiding said pulling and gripping frame portions along a rope;

a main piston/cylinder combination connected between said gripping and pulling frame portions for moving said gripping and pulling frame portions toward and away from each other in the longitudinal direction;

a first auxiliary piston/cylinder combination connected to said pulling frame portion;

a second auxiliary piston/cylinder combination connected to said gripping frame portion;

first and second driving bearing shafts detachably connected to said first and second auxiliary piston/cylinder combinations respectively;

first and second grippers each having a movably mounted clamping jaw extending in the longitudinal direction and movably mounted between a clamping and a releasing position for clamping and releasing a rope;

said first and second grippers being detachably connected to said first and second driving bearing shafts respectively for movement of first and second auxiliary piston/ cylinder combinations;

first and second mounting bearing shafts detachably connected to said pulling and gripping frame portions respectively, said first and second detachable mounting bearing shafts being detachably connected to said clamping jaws of said first and second grippers respectively so that movement of said grippers with movement of said auxiliary piston/-cylinder combinations causes movement of said clamping jaws between their clamping and releasing positions; and first and second walkers each having a movably mounted pawl for movement to engage and disengage a rack, said first and second walkers being detachably connected to said pulling and gripping frame portions respectively by said first and second mounting bearing shafts respectively, each pawl being detachably connected to one of said first and second auxiliary piston/cylinder combinations at said first and second drive bearing shafts respectively, said first and second walkers each having guide means for guiding said walkers in a longitudinal direction along a rack.

2. A convertible machine according to claim 1 wherein said pulling and gripping frame portions each comprise an L-shaped frame having a short upstanding leg and a long longitudinally extending leg, said main piston/cylinder combination being defined in and being connected between said short legs of said L-shaped frames, said long legs of said L-shaped frames extending in opposite directions from each other, said first and second detachable mounting bearing shafts being mounted to said long legs of said L-shaped frames respectively for linking said grippers and said walkers to said L-shaped frames.

3. A convertible machine according to claim 2, wherein said main piston/cylinder combination comprises a piston rod having a piston connected to one of said frame portions, the other of said frame portions defining a cylinder in which said piston and said piston rod is movable, said means for guiding a rope comprising said piston rod having a longitudinally extending central bore therethrough for receiving a rope.

4. A convertible machine according to claim 2, wherein each of said walkers comprises a base detachably connected to one of said long legs by one of said first and second mounting bearing shafts, said pole being pivotally mounted to said base, said guide means for the rack being mounted on each base, and a lever mechanism movably mounted to said base and connected between said pole of said base and said auxiliary piston/cylinder combination for said base.

5. A convertible machine according to claim 4, wherein each base comprises a pair of spaced apart cheek plates, said long leg extending between and being connected to said cheek plates, said guide means for guiding said bases on the rack being mounted to said cheek plates.

6. A convertible machine according to claim 5, wherein said guide means for guiding said bases on the rack comprise rollers rotatably mounted to said cheek plates.

7. A convertible machine according to claim 6, including a rack having side flanges forming treads for said rollers on which said bases are mounted for movement in the longitudinal direction.

8. A convertible machine according to claim 2, including a spring engaged with each auxiliary piston/-cylinder combination for biasing said clamping jaws and said pawls which are connected to said auxiliary piston/cylinder combination by said driving bearing shafts into a position for engaging a rope and for engaging a rack respectively.

* * * * *